(12) United States Patent
Grover et al.

(10) Patent No.: US 9,377,315 B2
(45) Date of Patent: Jun. 28, 2016

(54) SYSTEM AND METHOD TO PROVIDE VALET INSTRUCTIONS FOR A SELF-DRIVING VEHICLE

(71) Applicant: Myine Electronics, Inc., Ferndale, MI (US)

(72) Inventors: Joey Ray Grover, Madison Heights, MI (US); Scott Smereka, Warren, MI (US); Joel J. Fischer, Royal Oak, MI (US)

(73) Assignee: Myine Electronics, Inc., Ferndale, MI (US)

( * ) Notice: Subject to any disclaimer, the term of this patent is extended or adjusted under 35 U.S.C. 154(b) by 0 days.

(21) Appl. No.: 14/520,382

(22) Filed: Oct. 22, 2014

(65) Prior Publication Data

US 2016/0116293 A1    Apr. 28, 2016

(51) Int. Cl.
*G01C 22/00*     (2006.01)
*G01C 21/34*     (2006.01)
*G06Q 10/02*     (2012.01)
*G08G 1/14*      (2006.01)

(52) U.S. Cl.
CPC ................ *G01C 21/34* (2013.01); *G06Q 10/02* (2013.01); *G08G 1/147* (2013.01)

(58) Field of Classification Search
CPC ....... G06Q 10/02; G08G 1/147; G08G 1/148; G07B 15/02
USPC ............................... 701/2, 23, 300; 705/5, 13
See application file for complete search history.

(56) References Cited

U.S. PATENT DOCUMENTS

| 8,606,506 | B2 | 12/2013 | Johnson |
| 8,738,545 | B2 | 5/2014 | Abhyanker |
| 2007/0005202 | A1* | 1/2007 | Breed ............... B60W 50/0205 701/29.1 |
| 2013/0231824 | A1* | 9/2013 | Wilson et al. ................... 701/26 |

* cited by examiner

*Primary Examiner* — Gertrude Arthur Jeanglaud
(74) *Attorney, Agent, or Firm* — Jennifer M. Stec; Brooks Kushman P.C.

(57) ABSTRACT

A vehicle computer system in an autonomous vehicle includes a wireless transceiver configured to communicate with a remote device. The vehicle computer system also includes a processor in communication with the wireless transceiver. The processor is configured to receive instructions from the remote device to initiate an automatic valet-mode, receive data from the remote device indicative of a user's pick-up location, and send instructions to a vehicle module instructing the vehicle to drive to the user's pick-up location.

20 Claims, 5 Drawing Sheets

SYSTEM AND METHOD TO PROVIDE VALET INSTRUCTIONS FOR A SELF-DRIVING VEHICLE

TECHNICAL FIELD

The illustrative embodiments generally relate to utilizing an intelligent valet system for a vehicle.

BACKGROUND

An autonomous vehicle may be able to drive to various destinations. However, a user or passenger of the vehicle will still have to park the vehicle and return to where the vehicle is parked. In a city environment, such tasks may be inconvenient for a user. A user may prefer to remotely contact the vehicle in order to direct the vehicle to pick up the user from a specific location at a specific time. Furthermore, the user may prefer to be dropped "curb-side" to a point-of-interest.

SUMMARY

A first embodiment discloses a vehicle computer system in an autonomous vehicle including a wireless transceiver configured to communicate with a remote device. The vehicle computer system also includes a processor in communication with the wireless transceiver. The processor is configured to receive instructions from the remote device to initiate an automatic valet-mode, receive data from the remote device indicative of a user's pick-up location, and send instructions to a vehicle module instructing the vehicle to drive to the user's pick-up location.

A second embodiment discloses a vehicle computer system that includes an input-controller configured to receive instructions from a user-interface related to an automatic valet mode of an autonomous vehicle. The vehicle computer system also includes a processor communicating with the input-controller. The processor is configured to receive input from the input-controller activating the automatic valet mode and setting a pick-up location and a pick-up time, and send instructions to a vehicle module instructing the vehicle to drive to the pick-up location at or near the pick-up time.

A third embodiment discloses a system comprising a transceiver communicating with a remote-device. The system further comprises an input-controller configured to receive instructions from a user-interface related to a valet feature of an autonomous vehicle and a processor communicating with the transceiver and the input-controller. The processor is configured to receive input from the remote-device setting a pick-up location and time, and send instructions to a vehicle module instructing an autonomous vehicle to drive to the pick-up location at or near the pick-up time.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
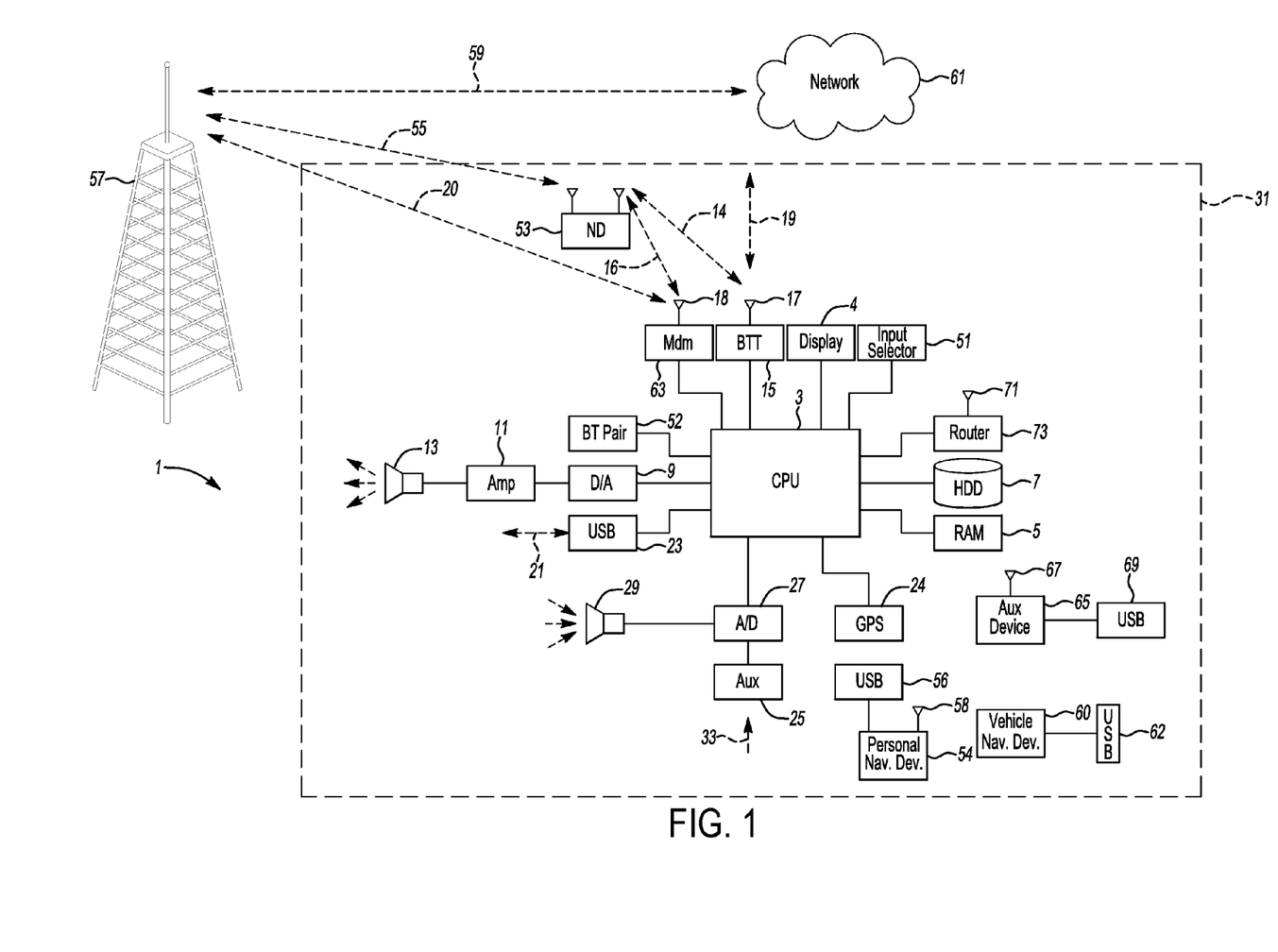
FIG. 1 illustrates an example block topology for a vehicle based computing system for a vehicle.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, at least one processor 3 controls at least some portion of the operation of the vehicle-based computing system 31. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. Non-transitory memory may include both persistent memory and RAM. In general, persistent memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, a screen 4, which may be a touchscreen display, and a BLUETOOTH input 15 are all provided. An input selector 51 is also provided, to allow a user to swap between various inputs. Input from both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus, a LIN bus, a MOST bus, an Ethernet bus, or a FlexRay bus) to pass data to and from the VCS (or components thereof).

Outputs from the processor 3 may include, but are not limited to, a visual display 4 and a speaker 13 or stereo system output. The speaker is connected to an amplifier 11 and receives its signal from the processor 3 through a digital-to-analog converter 9. Outputs can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Other wireless communication means that can be used in this realm is free-space optical communication (such as IrDA) and non-standardized consumer IR protocols or inductive coupled means including but not limited to near-field communications systems such as RFID.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Division Multiple Access (CDMA), Time Division Multiple Access (TDMA), Space-Division Multiple Access (SDMA) for digital cellular communication, including but not limited to Orthogonal Frequency-Division Multiple Access (OFDMA) which may include time-domain statistical multiplexing. These are all ITU IMT-2000 (3G) compliant standards and offer data rates up to 2 Mbps for stationary or walking users and 385 Kbps for users in a moving vehicle. 3G standards are now being replaced by IMT-Advanced (4G) which offers 100 Mbps for users in a vehicle and 1 Gbps for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply particular VACS to a given solution. In all solutions, it is contemplated that at least the vehicle computing system (VCS) located within the vehicle itself is cap able of performing the exemplary processes.

Figure 2:
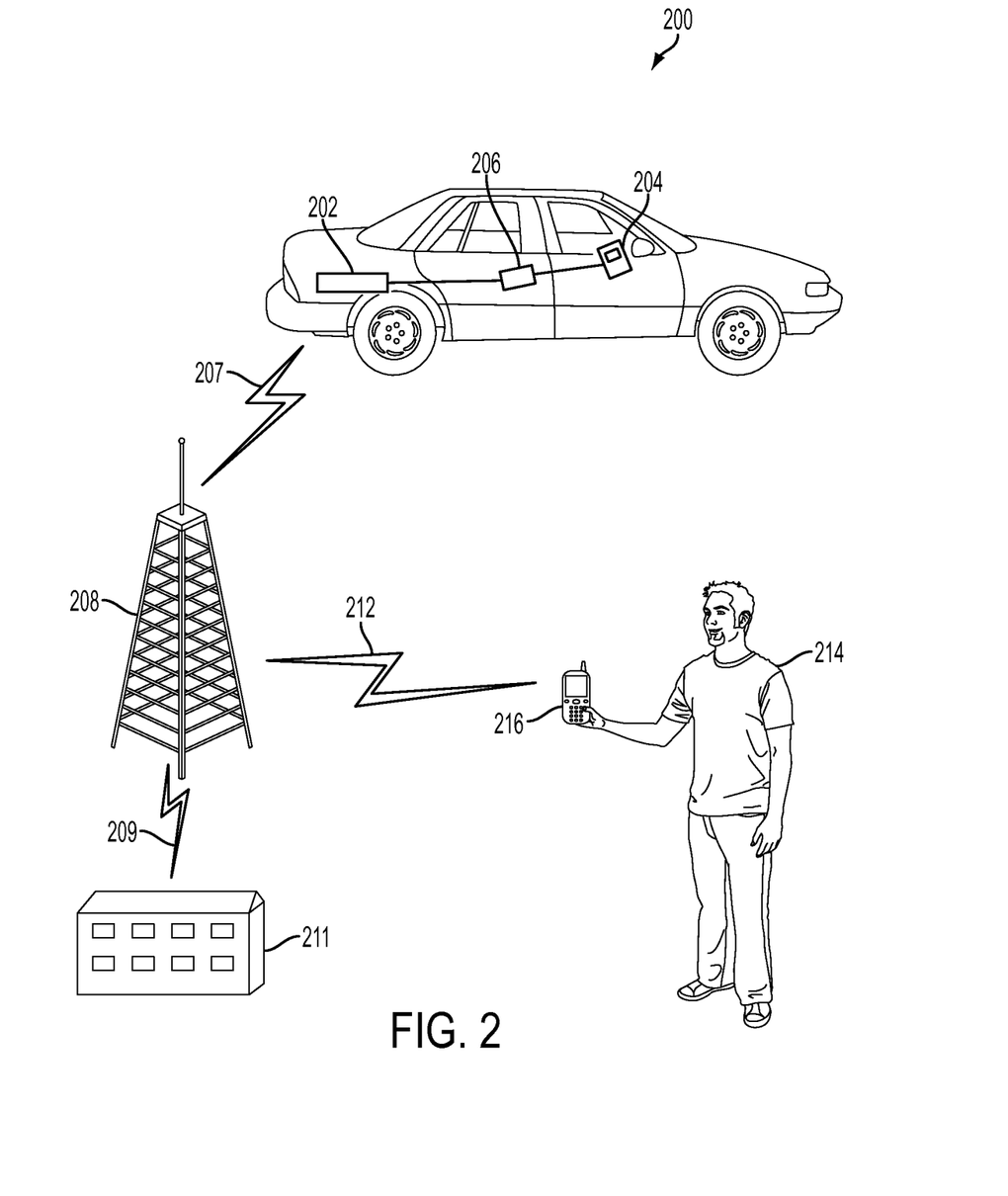
FIG. 2 illustrates an example of a user interacting with a vehicle based computing system for a vehicle.

FIG. 2 is an illustrative embodiment of a user and server interacting with a vehicle computer system. The vehicle 200 may be an autonomous vehicle that is self-driving or requires minimum driving from the vehicle. The vehicle may also include advanced driver assistance systems (ADAS) to facilitate autonomous driving of the vehicle. ADAS may include Additionally, the vehicle may include adaptive cruise control (ACC), lane departure warning systems, lane change assistance, collision avoidance system, intelligent speed adaptation, night vision, adaptive light control, pedestrian protection system, automatic parking, traffic sign recognition, blind spot detection, vehicular communication systems (e.g. vehicle to vehicle communication), hill descent control, electric vehicle warning sounds (e.g. hybrid vehicles and plug-in vehicles), and other systems to facilitate autonomous driving. The vehicle may include various sensors, such as radar, lidar, cameras that may help the vehicle understand traffic conditions and the vehicle environment. Additionally, the vehicle may be equipped with map data to know the road network and to incorporate various destinations, addresses, or points of interest of the user. Additionally, the vehicle navigation system may interact with off-board navigation systems (e.g. satellite traffic, TMC traffic, HD Radio Traffic, online traffic) to facilitate driver assistance.

The vehicle 200 may also include a vehicle bus transceiver 206 to communicate with various sensors on the vehicle, including the ADAS components of the vehicle. The vehicle bus transceiver 206, may also be in communication with an embedded modem 202 or a nomadic device 204. The embedded modem 202 and the nomadic device 204 may be used to communicate with a user who needs assistance and connectivity with the vehicle. Additionally, the vehicle may stay connected using Wi-Fi or other modules.

The vehicle 200 may communicate signals 207 with the cellular network 208. For example, the vehicle may send or receive signals 207 to communicate information to and from a user 214 and a server 211. The server may include a call center with live operators or voice-command based call center. For example, a server 211 may send a server signal 209 to the vehicle 200 via the communications network 208. The server 211 may send instructions to vehicle 200 to pick up a specific user 214. In another embodiment, the server 211 may send instructions to the user 214 to provide vehicle data or off-board data. In one example, the server 211 may provide the user 214 with data that there was an error that occurred during an automatic valet process. Other messages may be communicated to the user.

The user 214 may also communicate to the server 211 and vehicle 200 utilizing the communications network 208. The user 214 may send information from a user's nomadic device 216 to the vehicle 200. For example, the user 214 may send a nomadic device signal 212 to the vehicle 200 via the communications network 208 requesting the vehicle 200 to pick up the user 214. The user 214 may also communicate to a server 211 via the communications network 208. In some circumstances, the user 214 may be required to communicate data from the nomadic device 216 to the server 211. For instance, the server 211 may include additional control or operation of the vehicle 200 than a user's nomadic device 216. To access additional functionality, the user may request the server 211 to communicate the signals to the vehicle. Those signals may include instructions to enable or disable vehicle functionality that cannot be done via the cell phone for security reasons. For example, remote vehicle shut-off may only be accessed through the server 211, but activated by the nomadic device 216. The server 211 may be able to access such vehicle functionality to ensure the vehicle 200 is in a safe situation prior to turning off the vehicle. Additionally, an operator at the server 211 may be able to monitor vehicle conditions through interfaces on the server side.

Additionally, the user 214 of the nomadic device 216 may be able to receive various information from the vehicle 200. The vehicle 200 can notify the user 214 via the nomadic device 216 of information located on the vehicle bus 206 through the communications network 208. For example, the vehicle 200 may send data to a user's nomadic device 216 indicating the location of the vehicle, estimated time of arrival to the user, vehicle speed, fuel tank levels, user settings, etc.

Figure 3:
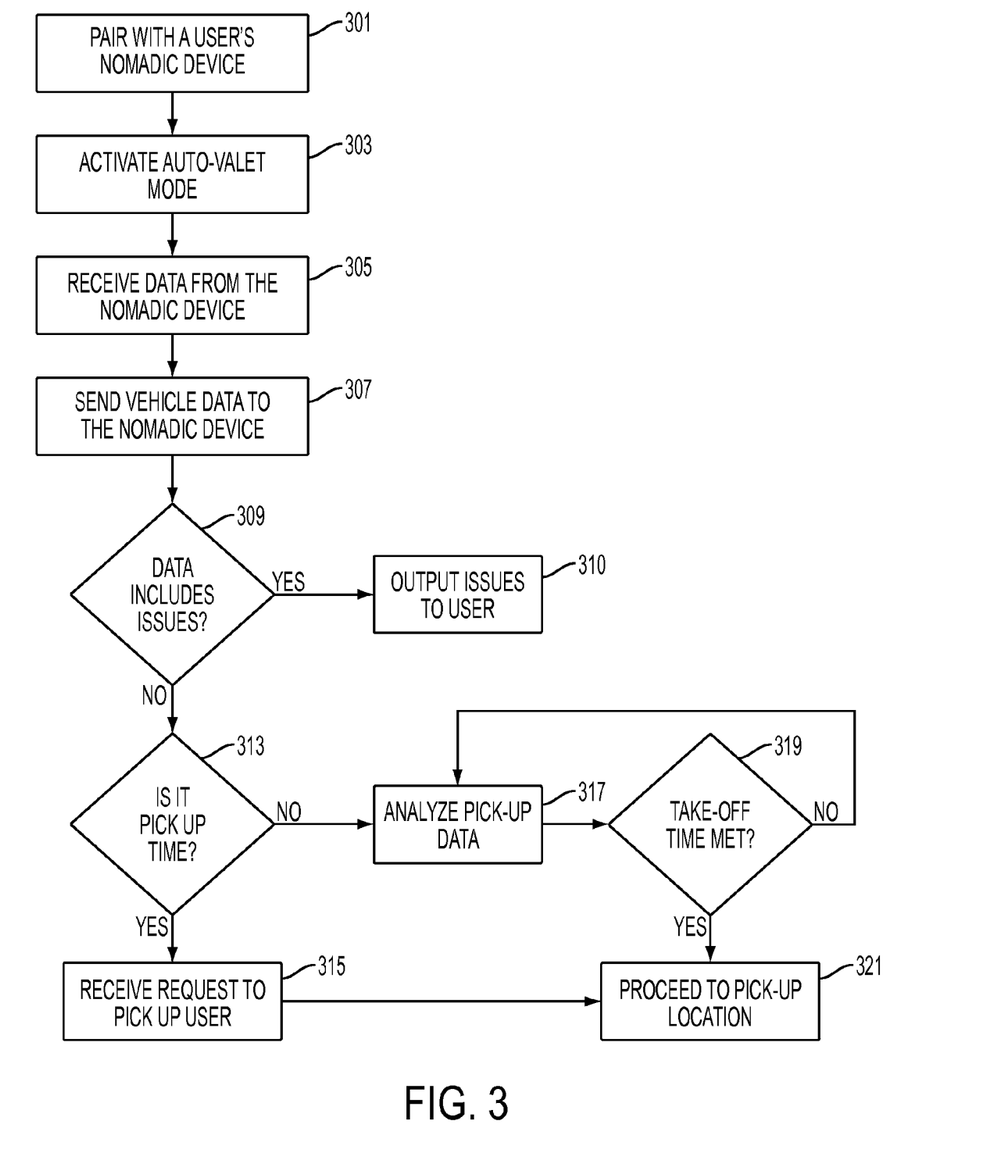
FIG. 3 illustrates an example flow chart of a nomadic device interacting with an autonomous vehicle for valet mode.

FIG. 3 illustrates an example flow chart of a nomadic device interacting with an autonomous vehicle for valet mode. The vehicle computer system may be able to pair with a user's nomadic device 301 to exchange vehicle data and data from the nomadic device. The nomadic device may contain an application that allows for operation of a vehicle, including an automatic valet mode of the vehicle. Additionally, an automatic valet mode may be functional from the nomadic device by accessing a website on the internet, or by dialing a call center connected to the vehicle. The automatic valet mode may allow a user to leave his/her automobile parked, and upon needed the vehicle again, being picked up from the user's location. While an automatic valet mode is one aspect of functionality equipped by the autonomous vehicle, other features may be activated by the nomadic device, including climate control, engine control, windows/moonroof control, vehicle data extraction (e.g. parking location, fuel information, etc), windshield wiper control. Additionally, the nomadic device may include functionality to program various destinations or stops that the autonomous vehicle can maneuver to.

A user may activate an auto-valet mode 301 in various ways. In one aspect, the user may activate the auto-valet mode remotely from the vehicle via a nomadic device. For example, a user may activate an auto valet mode from a mobile phone application in conjunction with utilizing a cellular network. In another example, a server may be able to communicate signals to the vehicle using a communication network. The server may receive indication to activate the auto-valet mode via a user activating the feature from a web site or calling the server. In yet another aspect, a user of the vehicle may activate the auto-valet mode utilizing the features of the vehicle computer system. The vehicle computer system may include an interface that allows for a user to schedule a pick up time and location. Additionally, it can coordinate a pickup of the user by coordinating information from a nomadic device that has been paired to the vehicle.

The vehicle computer system (VCS) may receive data from the nomadic device 305 to coordinate the auto-valet mode. For example, upon turning off the ignition of a vehicle that is paired with a nomadic device, the nomadic device may send data indicating where a user may venture to. For example, if a user has a schedule for dinner, concert, or movies, the nomadic device may send that information to the VCS. The VCS may also receive timing information (e.g. when the event will end) and location information. In other circumstances, the VCS may be able to utilize its own navigation database (either onboard or off-board) to determine location data. Additionally, the VCS may receive nomadic device data from a server in communication with the device and the car. In other embodiments, the nomadic device may be remote from the vehicle. However, the vehicle may maintain a connection to the nomadic device through a communications network (e.g. cellular network). Thus, the vehicle may send instructions to the nomadic device requesting information, or the nomadic device may actively send data to the vehicle as required.

The VCS may also be configured to send the nomadic device vehicle data as required 307. For example, during a parking and ignition off scenario, the vehicle may send information to the nomadic device as relevant to the auto-valet mode function. The VCS may send fuel information, parking information, battery information, etc to the nomadic device. The vehicle information can be sent while the nomadic device is near or in the vehicle, or remote from the vehicle. The VCS may also be able send the vehicle data to the nomadic device when the auto-valet feature is activated.

The VCS may analyze either the nomadic device data or the vehicle data to determine if issues are present when activating the auto-valet mode 309. For example, a user may try to enable auto-valet mode, however, the vehicle may have insufficient fuel or battery level to park and return to the user's location. Additional issues may include the ability to not provide autonomous driving due to local law or regulations. The VCS may output issues to the user 310. The output may be in the form of a message on the vehicle, including a text or audible message played through the vehicle speakers. The messages may be output the nomadic device as well. The error messages may be output to the nomadic device when the issues are determined near or in the vehicle's vicinity, or remote from the vehicle. The server may also be in communication with both the vehicle and the nomadic device to facilitate error handling of the messages.

The VCS may determine if the vehicle is ready to pick up the user 313. In some embodiments, the VCS may determine that the vehicle has a standing connection to a communications network due to an embedded modem. The VCS may ping a remote device to determine if any data was sent related to the valet mode. In other embodiments, the VCS may determine that the vehicle is only connected to a communications network when a nomadic device is paired with the vehicle. The VCS may utilize stored data to determine if the vehicle is ready to pick up the user. The VCS may analyze the nomadic device data 317. The VCS may determine that the nomadic device cannot be in communication with the vehicle when the nomadic device is remote from the vehicle. Thus, pick-up information for the user may need to be extracted and analyzed by the nomadic device data prior to the nomadic device losing communication with the VCS. For example, upon exiting the vehicle, the nomadic device may need to share information related to when the user must be picked up and a certain location to be picked up. In another example, the VCS may include an interface for inputting data related to the automatic valet feature, including a vehicle drop-off location, user drop-off location, user pick up time and location of the VCS. Other embodiments may utilize vehicle data, nomadic device data, or server data to allow the autonomous vehicle to pick up a user without the vehicle maintaining an internet connection.

Upon analyzing the data, the VCS may also calculate a proper take-off time 319 for the vehicle based on the pick-up time and location of the user. For example, the user may leave the vehicle in a parking structure 1 mile away from the pick-up location. The VCS can calculate the estimated travel time for the vehicle to leave the parking structure to arrive at the pick-up location at the correct time. The VCS can use historic traffic data, real-time traffic, speed limit information, road function class, and other navigation data to estimate the travel time. Thus, the vehicle may depart near the pick-up time to pick-up the user based on navigation data. For example, if it is a 10 minute commute for the vehicle to pick up the user, the vehicle can leave 10 minutes early to arrive on time to the pickup location. Once the appropriate departure time is met, the vehicle will leave to pick-up the vehicle. The vehicle may periodically check for a connection to send a message to the user or nomadic device informing them of a departure time or to send a reminder. Once the pick-up time is met, the vehicle may proceed to the pick-up location 321.

When the VCS determines that the vehicle may have the ability to maintain an internet connection, the vehicle may not need to analyze stored vehicle data, off-board data, or nomadic device data to determine a pick-up location. Instead, the user may send a request from the nomadic device to pick-up the user. The VCS may receive the request from the nomadic device or user 315. The nomadic device can send a real-time request to the user by utilizing the cellular network. Additionally, the user may utilize the nomadic device to remotely set a pick-up time and location that indicates a pick-up time in the future.

The VCS may trigger the vehicle to proceed to destination once the user remotely requests to be picked up. In other embodiments, the user may utilize the nomadic device to set the pick-up time and location remotely. Additionally, the VCS may trigger the vehicle to proceed to the destination based on a time interval (e.g. pick up in 5 minutes, 10 minutes, 1 hour, etc). The VCS may determine the appropriate departure time for the vehicle based on the traffic conditions. Once the pick-up time is met, the vehicle may proceed to the pick-up location 321. The VCS may utilize the vehicle bus to send data to the ADAS system to inform the vehicle to drive to the appropriate location. The VCS may send the location, route, departure time, etc. Additionally, the VCS may also output a notification or message to the remote user that the vehicle is proceeding to pick up the user. The VCS may utilize the cellular connection to actively provide coordinate data in real-time. Thus, the user may utilize the nomadic device to remotely monitor the vehicle's route and location. Additionally, the vehicle may send coordinate updates continuously to allow the user to monitor the entire route. If a connection is maintained, the nomadic device can make various edits to the route or pick-up destination. For example, if the user realizes that the pick-up destination is a long commute due to traffic, the user may update a pick-up location that is different than the original pick-up location. Thus, the user can walk towards the car and meet at a point in between.

While the flow chart described above is one embodiment, other embodiments and versions may exists. The embodiment described above is just one non-limiting example. For example, certain steps and actions may be removed in certain embodiments. In other embodiments, certain steps may be altered to appear in a different order. For example, the VCS may determine whether the vehicle maintains a communications network connection before activating the auto-valet mode.

Figure 4:
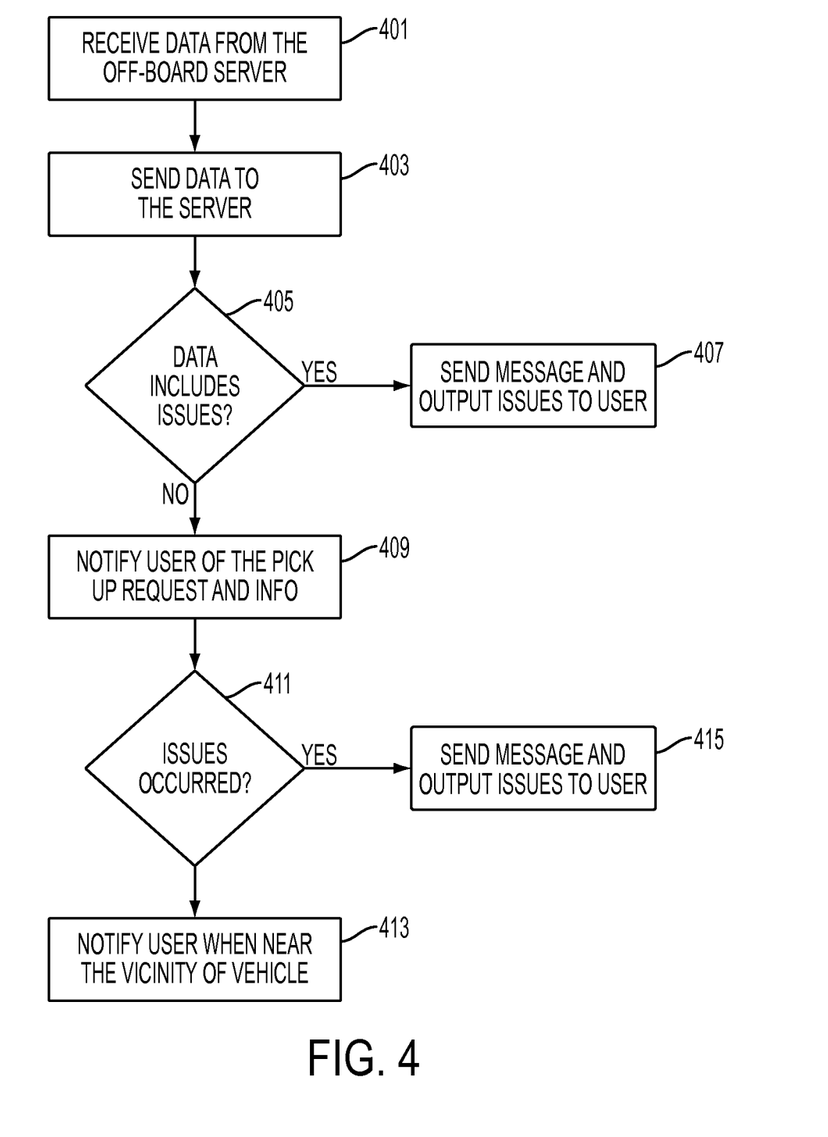
FIG. 4 illustrates an example flow chart of an off-board server and nomadic device interacting with an autonomous vehicle for valet mode.

FIG. 4 illustrates an example flow chart of an off-board server and nomadic device interacting with an autonomous vehicle for valet mode. Rather than directly interacting with an autonomous vehicle via a nomadic device, an off-board server may interact with the vehicle. For example, a user may reach out to an operator at a server to control the vehicle. The server may be in communication with the vehicle to send/receive data. In another example, a user may utilize a computer that is connected to the Internet to communicate with a server. A website may be in communication with the server to communicate data to the vehicle. Additionally, the website may have an interface to control vehicle settings and operation. The website may be accessible from a nomadic device as well.

The vehicle may receive data from the off-board server 401. The data may relate to vehicle functionality, nomadic device data, or other data. In one example, the server may send data to the vehicle that indicates the user's location, a pick-up time, and contact information. The server may be able to send data to the vehicle to assist in autonomous driving. The server may be able to send traffic data, construction data, event data (e.g. accident, emergency, concert information, etc.), Point-of-Interest (POI) information, and other data. In one example, the server may recognize that the vehicle is parked in a garage that may be closing. The server may provide information to the user in the form of a notification allowing the user to be notified that the The vehicle may also send data to the server 403. The vehicle may send data indicative of a pick-up time that is set by an interface of the VCS, the vehicle's current location, the vehicle's parking location, and information related to the vehicle's environment (e.g. weather, traffic, POI information, etc.) For example, if a user sets a valet-pick up from the VCS, the VCS may send data to the server indicative of the valet-pick up.

The vehicle computer system may determine if the data from a nomadic device or server includes any issues or errors 405. For example, a user may try to enable auto-valet mode utilizing the server, however, the vehicle may have an insufficient fuel or battery level to park and return to the user's location. Additional issues may include the ability to disable autonomous driving due to local law or regulations. If the vehicle determines that the data includes an issue or an error, a message may be output to the user. In another example, a parking area for the vehicle may be closed at time that would be prior to the vehicle's departure time to pick up a user. Thus, a user must be notified of such an issue in order to coordinate an additional parking location or earlier pick-up time. The VCS may output issues to the user 407. Additionally, the server may be able to output notifications that an error has occurred. The server may output a notification at the vehicle, a nomadic device, a computer, or elsewhere. The output may be in the form of a message on the vehicle, including a text or audible message played through the vehicle speakers. The messages may be output the nomadic device as well. The error messages may be output to the nomadic device when the issues are determined near or in the vehicle's vicinity, or remote from the vehicle. The server may also be in communication with both the vehicle and the nomadic device to facilitate error handling of the messages. Thus, the server may be configured to receive all relevant data (e.g. nomadic device data, vehicle data, server data, etc) to process any errors for output.

The vehicle computer system may then notify the user of the pick-up request via the server and provide info related to the request 409 that was initiated by the server. Such information that may be sent to the user include the vehicle location (e.g. drop-off location), pick-up time, time to arrival, time to the user, off-board environment data (e.g. traffic data, weather data, incident data, etc). The VCS may send the info to the server. An operator of the server may be able to explain such information to a user. In other scenarios, the data may be output to the user's computer or mobile device through an application, website, or e-mail. The notification may also include a reminder that is triggered at a threshold time to notify the user that the vehicle will be arriving at a certain time.

The vehicle computer system may determine if issues related to the pick-up or drop-off request 411. The vehicle computer system or server may analyze data to determine if any issues have occurred as related to the user's request. For example, a user may try to enable auto-valet mode, however, the vehicle may have insufficient fuel or battery level to park and return to the user's location. Additional issues may include the ability to not provide autonomous driving due to local law or regulations. Further issues may include late arrival of the vehicle, vehicle malfunction (e.g. flat tire, or other electrical or mechanical issue of the vehicle), incorrect drop-off location, POI being closed or not available, etc. The VCS may output issues to the user 415. The output may be in the form of a message to the user's mobile phone, including a text or audible message. The messages may be output to an e-mail address associated to a user or to a web-site that is accessible by a mobile device or computer. The error messages may be output to the nomadic device when the issues are determined near or in the vehicle's vicinity, or remote from the vehicle. The server may also be in communication with both the vehicle and the nomadic device to facilitate error handling of the messages.

The VCS may utilize the server to notify the user when the vehicle is approaching the vicinity of the user or a drop-off location 413. The server may be configured to constantly update the user's nomadic device by sending a map of the vehicle's current location. Additionally, a message may be sent to notify the user that it is approaching the pick-up location. In another scenario, the message may include a message to notify a user of the vehicle's departure or an unexpected delay. The server may send the message to the user's nomadic device, email address, or other contact device. Furthermore, an operator or automated message may be able dial the user to notify the user when the vehicle is approaching the pick-up location.

Figure 5:
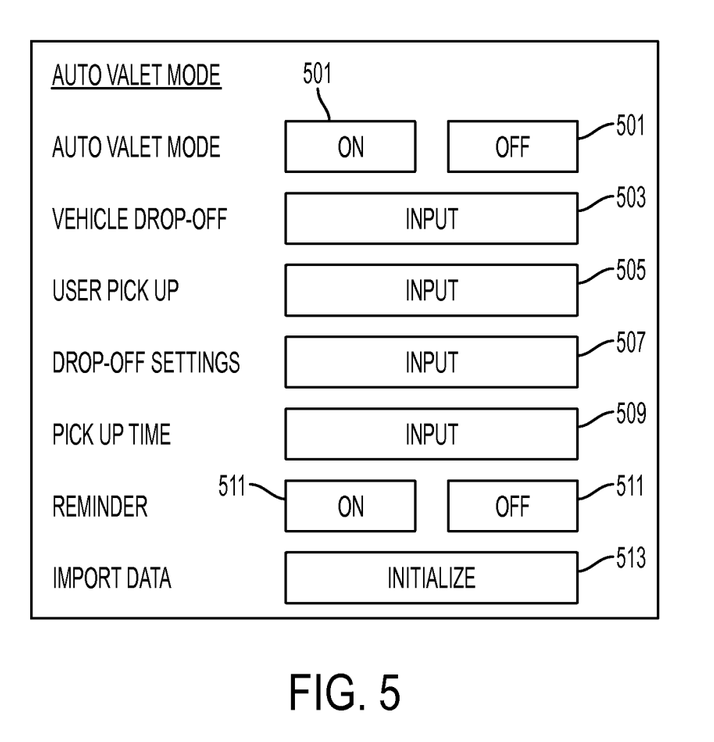
FIG. 5 illustrates an example human machine interface used to modify setting of an automatic valet feature.

FIG. 5 is an example of a human machine interface (HMI) that may be implemented to set the auto valet mode. The example interface may be utilized on the vehicle computer system, website, application of a nomadic device, or another type of interface. Additionally, the interface may utilize voice recognition commands to set a pick-up time, departure time, parking location, or other setting.

The auto valet mode feature may be enabled or disabled by a setting 501. By enabling the feature, the autonomous vehicle may be able to coordinate a pick-up and drop-off location. Furthermore, the vehicle may be able to coordinate various driving locations to park or drop-off/pickup other passengers or users.

The human machine interface of a device may allow a user to input the vehicle drop-off location 503. Thus, the user can set a location to park the vehicle for a short-term period or long term pick up. Additionally, multiple parking locations may be set with duration for each parking period. A user may input the vehicle drop-off area by inputting an address, POI, coordinates, intersection, pre-set destination, etc.

The HMI of a device may allow a user to input a user pick-up location 505. Thus, the user can set a location to pick-up one or more users. A user may input the user pick-up location by inputting an address, POI, coordinates, intersection, pre-set destination, etc.

The HMI of a device may allow a user to input a drop-off settings 507. Thus, the user can set a location to drop-off one or more users. A user may input the drop-off location by inputting an address, POI, coordinates, intersection, pre-set destination, etc. Furthermore, the HMI may allow a user to set drop-off times for one or more users. For example, the vehicle may be programmed to drop of multiple users in a certain order. Additionally, they may be dropped off at certain times.

The HMI of a device may allow a user to input a pick-up time 509. Thus, the user can set a specific time to pick up one or more users. A user may input the pick-up time by inputting a specific time, duration, request an on-demand pick up (e.g. pick-up now). The pick-up time may be required to be done by a certain time as well. For example, the user may request to be picked-up by 10 PM or the close of business for a POI. Thus, the vehicle may calculate a departure time to arrive at the pick-up location. Furthermore, the HMI may allow a user to set drop-off times for one or more users. For example, the vehicle may be programmed to drop of multiple users in a certain order. Additionally, they may be dropped off at certain times.

The HMI may allow a user to turn on a reminder notification 511. The reminder notification may send a message to one or more users notifying them that the vehicle will be departing to pick-up the user. The reminder may be sent by a time specified by the user or at the departure time of the vehicle. As previously discussed, the reminder may be in the form of an e-mail, message, push notification, audible output, or a phone call.

Additionally, the HMI of the device may allow the user to import data 513 that can be coordinated for the auto valet feature. For example, another application, such as a calendar, reservation application, booking application, etc may contain information related to a user's schedule, destination, etc. The HMI may allow the user to import such data to coordinate for auto-valet mode. For example, if the user has a flight scheduled at an airport, the auto-valet feature may import such data too coordinate a drop-off time for the flight, as well as a parking location and duration for the vehicle. In another example, the application may send arrival information to a VCS. Thus, the vehicle may understand when to pick up the user and the location to pick up the user. In another example, the data may include updated flight information to update the valet schedule.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle computer system in an autonomous vehicle, comprising:
    a wireless transceiver configured to communicate with a remote device of a user;
    a processor in communication with the wireless transceiver, the processor configured to:
        receive instructions from the remote device to initiate an automatic valet-mode;
        receive data from the remote device indicative of a user's pick-up location;
        determine a vehicle malfunction based upon vehicle data and a pick-up request or drop-off request of the user;
        output an error message to the remote device, wherein the error message is attributable to a vehicle controller error affecting the pick-up request or drop-off request; and
        send instructions to a vehicle module instructing the vehicle to drive to the user's pick-up location.

2. The vehicle computer system in an autonomous vehicle of claim 1, wherein the processor is further configured to receive data from the remote device indicative of a user's pick-up time.

3. The vehicle computer system in an autonomous vehicle of claim 2, wherein the processor is further configured to determine a departure time of the vehicle, wherein the departure time is determined utilizing a travel time from a vehicle's current location to the user's pick-up location, and the user's pick-up time.

4. The vehicle computer system in an autonomous vehicle of claim 3, wherein the processor is further configured to utilize traffic data to calculate the departure time of the vehicle.

5. The vehicle computer system in an autonomous vehicle of claim 1, wherein the remote device is an off-board server or nomadic device.

6. The vehicle computer system in an autonomous vehicle of claim 1, wherein the processor is further configured to determine a status related to the automatic-valet mode and send a notification indicating the status to the remote device.

7. The vehicle computer system in an autonomous vehicle of claim 1, wherein the processor is further configured to receive data indicative of a parking location of the vehicle and a drop-off location of the user.

8. The vehicle computer system in an autonomous vehicle of claim 1, wherein the vehicle module is an advanced driver assistance system.

9. The vehicle computer system in an autonomous vehicle of claim 1, wherein the pick-up time is an on-demand pick-up or a future time.

10. The vehicle computer system in an autonomous vehicle of claim 1, wherein the processor is further configured to send the data from the remote device indicating a vehicle's current location.

11. The vehicle computer system in an autonomous vehicle of claim 1, wherein the processor is further configured to send the remote device route data indicating a vehicle's route based on a vehicle's current location and the user's pick-up location.

12. The vehicle computer system in an autonomous vehicle of claim 1, wherein the error message is output to the remote-device initiating the automatic valet mode.

13. The vehicle computer system in an autonomous vehicle of claim 1, wherein the vehicle malfunction includes a vehicle battery level below a threshold to drive to the user's pick-up location.

14. The vehicle computer system in an autonomous vehicle of claim 1, wherein the vehicle malfunction includes a fuel level below a threshold to drive to the user's pick-up location.

15. The vehicle computer system in an autonomous vehicle of claim 1, wherein the processor is further configured to output the malfunction after autonomously driving to the user's pick-up location.

16. The vehicle computer system in an autonomous vehicle of claim 1, wherein the processor is further configured to output the malfunction before autonomously driving to the user's pick-up location.

17. The vehicle computer system in an autonomous vehicle of claim 1, wherein the processor is further configured to determine the malfunction after autonomously driving to the user's pick-up location.

18. A vehicle computer system, comprising:
    an input-controller configured to receive instructions from a related to an automatic valet mode of an autonomous vehicle;
    a processor communicating with the input-controller configured to:
        receive input from the input-controller activating the automatic valet mode and setting a pick-up location and a pick-up time;
        output a vehicle error in response to vehicle data indicating a vehicle controller error affecting a pick-up or a drop-off request of the user;
        send instructions to a vehicle module instructing the vehicle to drive to the pick-up location at the pick-up time.

19. The vehicle computer system of claim 18, wherein the processor is further configured to determine a departure time of the vehicle, wherein the departure time is determined utilizing a travel time from a vehicle's current location to the pick-up location, and the pick-up time.

20. A system in an autonomous vehicle, comprising:
a processor, in response to instructions received from a mobile phone-initiating an autonomous valet mode including a pick-up location and time, send instructions to a vehicle controller instructing the vehicle to execute autonomous drive commands to drive to the pick-up location before the pick-up time; and output a vehicle to the mobile phone indicating a vehicle controller error affecting a user pickup request.

* * * * *